UNITED STATES PATENT OFFICE 2,505,838

11-KETOPREGNENES AND PROCESS

Lewis H. Sarett, Princeton, N. J., assignor to Merck & Co., Inc., Rahway, N. J., a corporation of New Jersey No Drawing. Application August 2, 1946, Serial No. 687,982

8 Claims. (Cl. 260—397.3)

This invention is concerned generally with novel chemical compounds of the cyclopentanodimethylpolyhydrophenanthrene series and processes of preparing the same; more particularly it relates to $\Delta^{17,20}$-3,11-diketo-pregnene and $\Delta^{20,21}$-3,11-diketo-pregnene and with methods of manufacturing these compounds from readily available starting materials. The new compounds thus produced are of value in the preparation of adrenal hormones such as dehydrocorticosterone and andrenosterone. They are also of value as a means of establishing the structure of other organic compounds.

These isomeric 3,11-diketo-pregnenes, subject to this application, can be represented by the following structural formulae:

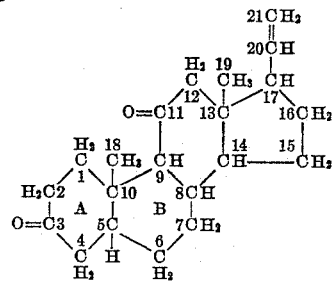

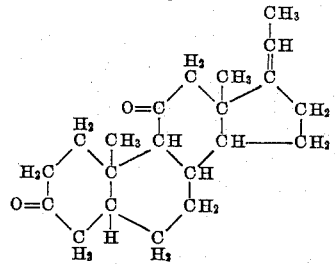

These formulae for purposes of convenience are hereinafter reproduced below in the abbreviated form:

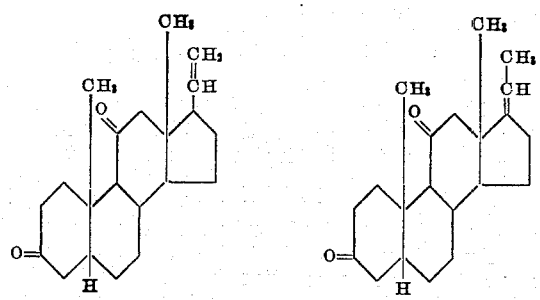

In the following description of the invention, the stereochemical relationships of the substituents are indicated by the following convention:

(1) A substituent in the C$_3$ position which is trans to the C$_{10}$ group, is parenthetically designated "$a$";

(2) The stereochemical relationships of rings A and B are indicated in the formulae as solid lines representing the valence bond in the cis configuration.

In accordance with the present invention, it is now found that $\Delta^{17,20}$-3,11-diketo-pregnene and $\Delta^{20,21}$-3,11-diketo-pregnene can be synthesized by reactions indicated generically as follows:

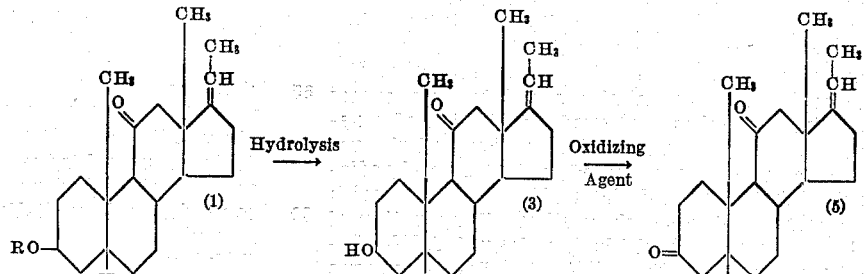

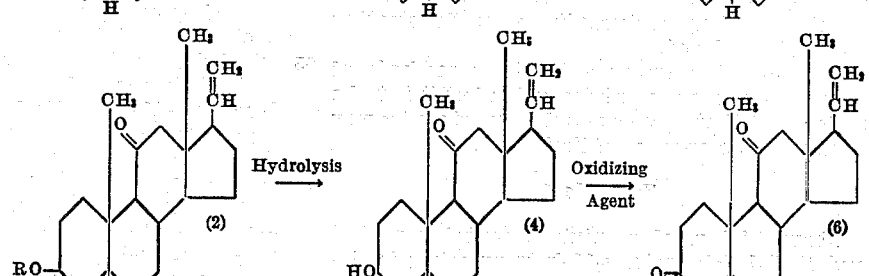

wherein R is acyl.

The reactions above indicated are carried out as follows: A stereoisomer of $\Delta^{17,20}$-3-($a$)-acyloxy-11-keto-pregnene (1), $\Delta^{20,21}$-3-($a$)-acyloxy-11-keto-pregnene (2) or mixtures thereof, which can be prepared as described in my copending application, Serial No. 605,194, filed July 14, 1945, now abandoned, is reacted with a hydrolyzing agent to produce the corresponding stereoisomer of the 3-($a$)-hydroxy derivative (3 and 4); this compound is then reacted with an oxidizing agent whereby the hydroxyl group in the 3- position is oxidized to a keto group to form the corresponding $\Delta^{17,20}$-3,11-diketo-pregnene (5), the $\Delta^{20,21}$-3,11-diketo-pregnene (6) or mixtures thereof.

In carrying out the presently invented process, the starting materials, intermediates (1 and 2) above which are obtained as a mixture when prepared according to the process disclosed in my co-pending application referred to above, are reacted with an alkaline hydrolyzing agent under saponifying conditions to effect hydrolysis of the 3-acyloxy group. Any aqueous alkaline solution can be employed, but it is presently preferred to effect the hydrolysis by means of methanolic potassium hydroxide which is reacted with the starting material at room temperature or preferably under reflux, under which conditions the time required for hydrolysis is approximately ½ hour. The hydrolyzed product is recovered from the solution by evaporating the solvent therefrom and extracting the pregnene derivative from the inorganic salts by means of an organic solvent such as ether which upon evaporation yields a crude mixture of $\Delta^{17,20}$ and $\Delta^{20,21}$-3-($a$)-hydroxy-11-keto-pregnene (3 and 4).

The $\Delta^{17,20}$-3-($a$)-hydroxy-11-keto-pregnene, or $\Delta^{20,21}$-3-($a$)-hydroxy-11-keto-pregnene, or as presently preferred, a mixture of these compounds is then reacted with an oxidizing agent such as chromium trioxide preferably in a solution in an inert solvent such as an aqueous aliphatic acid solution as for example, aqueous acetic acid, aqueous propionic acid and the like. It is preferred to conduct the reaction at below about 20° C., under which conditions the time required for the oxidation is approximately 1 hour. In practicing the present invention, the oxidation is preferably carried out under mild conditions in a medium having a pH of approximately 1 to 7; although the preferred medium is aqueous acetic acid or other lower aliphatic monocarboxylic acids, it is possible to employ dialkyl ketones such as acetone as a medium for this oxidation reaction. After the oxidation is substantially complete, any excess oxidizing agent is destroyed by addition of a reducing agent such as sodium sulfite and the resulting solution evaporated to dryness and redissolved in water and the residue extracted with an organic solvent such as ether. Evaporation of the ether extract yields the desired $\Delta^{17,20}$-3,11-diketo-pregnene, the $\Delta^{20,21}$-3,11-diketo-pregnene or mixtures thereof, depending upon the starting material employed.

The following examples illustrate methods of carrying out the present invention but it is to be understood that these examples are given by way of illustration and not of limitation.

*Example 1*

About 14.6 g. of a mixture containing $\Delta^{17,20}$ and $\Delta^{20,21}$-3-($a$)-acetoxy-11-keto-pregnene is dissolved in about 100 cc. of 1.1 N methanolic potassium hydroxide and the solution is heated under reflux for approximately ½ hour. Substantially all of the methanol is evaporated under reduced pressure, the residual material is diluted with water, and the aqueous mixture extracted with ether. The ether extract is washed with water, evaporated to dryness on the steam bath to produce a crude mixture of $\Delta^{17,20}$ and $\Delta^{20,21}$-3-($a$)-hydroxy-11-keto-pregnene.

About 12.2 g. of this mixture of $\Delta^{17,20}$ and $\Delta^{20,21}$-3-($a$)-hydroxy-11-keto-pregnene is dissolved in about 1200 cc. of glacial acetic acid, and a solution containing about 6 g. of chromic acid, about 120 cc. of water and about 120 cc. of glacial acetic acid is added thereto with agitation. The temperature of the resulting solution is maintained at approximately 16° C. during the addition of the oxidizing agent and for approximately 1 hour thereafter. About 12 g. of sodium sulfite is then added and the mixture is stirred until the excess chromic acid is reduced. The solution is then evaporated under reduced pressure, the residual material diluted with water and the aqueous mixture extracted with ether. The ether extract is washed with dilute aqueous potassium carbonate, then with water and finally evaporated to dryness on the steam bath to produce a crude mixture of $\Delta^{17,20}$- and $\Delta^{20,21}$-3,11-diketo-pregnene.

*Example 2*

The above procedure can be carried out using the individual stereoisomers instead of the mixture of $\Delta^{17,20}$ and $\Delta^{20,21}$-3-($a$)-acetoxy-11-keto-pregnenes employed in Example 1. This mixture of stereoisomeric 3-($a$)-acetoxy-11-keto-pregnenes can be separated by fractional crystallization from methanol to produce substantially pure $\Delta^{17,20}$-3-($a$)-acetoxy-11-keto-pregnene (M. P. 105–106° C.), and, $\Delta^{20,21}$-3-($a$)-acetoxy-11-keto-pregnene (M. P. 86–87° C.).

The $\Delta^{17,20}$-3-($a$)-acetoxy-11-keto-pregnene is hydrolyzed by heating with methanolic potassium hydroxide to produce $\Delta^{17,20}$-3-($a$)-hydroxy-11-keto-pregnene. This compound is then oxidized by treatment with a glacial acetic acid solution of chromic acid and the oxidation mixture treated as described in Example 1 to produce an ether extract which upon evaporation yields an oil which is substantially pure $\Delta^{17,20}$-3-11-diketo-pregnene.

$\Delta^{20,21}$-3-($a$)-acetoxy-11-keto-pregnene is hydrolyzed by heating with methanolic potassium hydroxide and the hydrolysis product recrystallized from aqueous ethanol to produce substantially pure $\Delta^{20,21}$-3-($a$)-hydroxy-11-keto-pregnene (M. P. 147° C., followed by resolidification and remelting at 155° C.)

This compound is then oxidized and the oxidation product worked up as described in Example 1 to produce substantially pure $\Delta^{20,21}$-3,11-diketo-pregnene.

I claim:

1. The process of preparing a 3,11-diketo-etiocholane containing a radical in the 17-position selected from the class which consists of vinyl and ethylidene radicals from the corresponding 3-acyloxy-11-keto-etiocholane derivative, which comprises reacting the latter compound with a hydrolyzing agent under saponifying conditions to form the corresponding 3-hydroxy compound; and directly reacting this compound with chromic acid to produce the desired 3,11-diketo-etiocholane derivative.

2. The process which comprises reacting a mixture containing $\Delta^{17,20}$-3-($a$) - acetoxy-11-ketopregnene and $\Delta^{20,21}$-3-(a)-acetoxy-11-keto-pregnene with methanolic potassium hydroxide to produce a mixture containing $\Delta^{17,20}$-3-(a)-hydroxy-11-keto-pregnene and $\Delta^{20,21}$-3-(a)-hydroxy-11-keto-pregnene; and directly reacting said mixture with chromic acid to produce the corresponding mixture of $\Delta^{17,20}$-3,11-diketo-pregnene and $\Delta^{20,21}$-3,11-diketo-pregnene.

3. The process which comprises reacting a compound selected from the class which consists of $\Delta^{17,20}$-3-hydroxy-11-keto-pregnene, and $\Delta^{20,21}$-3-hydroxy-11-keto-pregnene, with chromic acid to produce the corresponding stereoisomer selected from the class which consists of $\Delta^{17,20}$-3,11-diketo-pregnene and $\Delta^{20,21}$-3,11-diketo-pregnene.

4. The process which comprises reacting a mixture containing $\Delta^{17,20}$-3-(a)-hydroxy-11-keto-pregnene and $\Delta^{20,21}$-3-(a)-hydroxy-11-keto-pregnene with chromic acid to produce the corresponding mixture of $\Delta^{17,20}$-3,11-diketo-pregnene and $\Delta^{20,21}$-3,11-diketo-pregnene.

5. $\Delta^{20,21}$-3-(a)-hydroxy-11-keto-pregnene.

6. $\Delta^{17,20}$-3-11-diketo-pregnene.

7. $\Delta^{20,21}$-3,11-diketo-pregnene.

8. 17-substituted-3,11-diketo-etiocholanes in which the 17-positions substituent is a radical selected from the class which consists of vinyl and ethylidene radicals.

LEWIS H. SARETT.

REFERENCES CITED

The following references are of record in the file of this patent:

UNITED STATES PATENTS

| Number | Name | Date |
| --- | --- | --- |
| 2,143,453 | Ruzicka | Jan. 10, 1939 |
| 2,254,562 | Bockmuhl | Sept. 2, 1941 |
| 2,256,500 | Serini | Sept. 23, 1941 |